May 12, 1970            P. H. PAPA            3,512,024

FRAMELESS PERMISSIBLE DYNAMOELECTRIC MACHINE

Filed Aug. 19, 1968            2 Sheets-Sheet 1

INVENTOR.
Paul H. Papa
BY Murray A. Gleeson
ATTORNEY

May 12, 1970  P. H. PAPA  3,512,024
FRAMELESS PERMISSIBLE DYNAMOELECTRIC MACHINE
Filed Aug. 19, 1968  2 Sheets-Sheet 2

INVENTOR.
Paul H. Papa
BY
Murray A. Gleeson
ATTORNEY

United States Patent Office 3,512,024
Patented May 12, 1970

3,512,024
FRAMELESS PERMISSIBLE DYNAMOELECTRIC MACHINE
Paul H. Papa, Chicago, Ill., assignor to Westinghouse Air Brake Company, Pittsburgh, Pa., a corporation of Pennsylvania
Filed Aug. 19, 1968, Ser. No. 753,533
Int. Cl. H02k 5/04
U.S. Cl. 310—88    11 Claims

ABSTRACT OF THE DISCLOSURE

Frameless, explosion-proof or permissible dynamoelectric machine such as a motor or generator in which a laminated stator core is held compressed between end rings. A circumferentially continuous stream or envelope of cooling air is directed from a rotor-carried fan along outer, heat-discharging peripheral surfaces of the end rings and core. These surfaces have substantially the same outer cross sectional shape and size to facilitate heat transfer into the moving air stream.

BACKGROUND OF THE INVENTION

The field of invention is a dynamoelectric machine such as a motor or generator. A motor of this type is used to power underground mining machines which may operate in atmospheres containing explosive concentrations of hazardous dusts or gases such as coal, methane and the like.

The problem of cooling such a motor is unique and complicated by factors such as the following: it must be sealed, so there is no opportunity for cooling air to pass through the areas where heat is generated; and the conventional way of sealing such motors is to enclose the stator within a separate, sealed frame which traps heat inside. It must be compact, with the heat-generating elements close together and with relatively small outside surface areas for discharging heat. Finning is of marginal value where coal or ore dust may pack the spaces between fins. And water cooling is often impractical because water is generally unavailable especially for mobile equipment underground.

SUMMARY OF THE INVENTION

This invention relates generally to a permissible dynamoelectric machine, and more particularly to a permissible motor or generator having an improved arrangement for discharging heat to the atmosphere. "Permissible" means approved by certain safety regulating agencies, such as the United States Bureau of Mines, for operation in hazardous environments.

An important object of the present invention is to provide a frameless permissible dynamoelectric machine in which heat is discharged from a laminated stator core and end rings directly to the atmosphere.

A specific object of the invention is to provide a frameless permissible dynamoelectric machine in which heat is brought to an outer, heat-discharging peripheral surface of a shell comprising the stator core and end rings compressibly flanking the core, and removing the heat from the shell by directing cooling air along the length of the shell.

An important feature of the present invention is that the outer heat-discharging peripheral surfaces of the stator core and end rings are continuous and of substantially uniform diameter or cross section, and cooling air is directed in a circumferentially continuous stream or envelope successively along those peripheral surfaces to transfer heat uniformly into the air.

A further specific object of the present invention is to provide a frameless permissible dynamoelectric machine having a substantially uniform diameter heat-transmitting shell consisting of the stator lamination core flanked by end rings compressing the core, an annular air guide encircling one end of the shell, and a rotor-carried fan effective to direct ambient cooling air through the annular guide in a circumferentially continuous stream or envelope along the length of the shell.

Further objects and advantages will be apparent from the following description in connection with the accompanying drawings in which.

Figure 1:
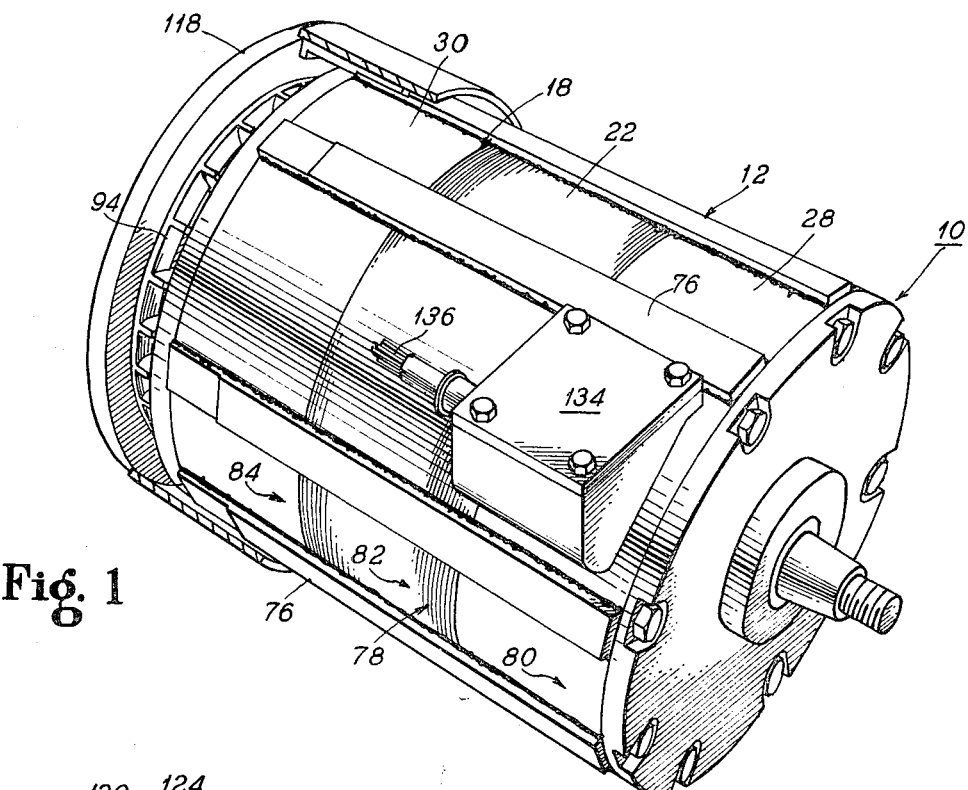
FIG. 1 is a fragmentary perspective view of a dynamoelectric machine embodying the present invention, in the form of an induction motor.

The motor 10 comprises an external, sealed stator 12, an internal rotor 14, and an air gap 16 in between.

The stator 12 comprises an elongated heat-transmitting shell 18 consisting of laminations 20 juxtaposed to form a core 22 with end faces 24 and 26, respectively, flanked by a pair of end rings 28 and 30. A series of windings 32 extend through the core and have end portions 34 projecting beyond each core end face. The end rings 28 and 30 encircle the winding end portions 34 and extend axially beyond them.

Figure 4:
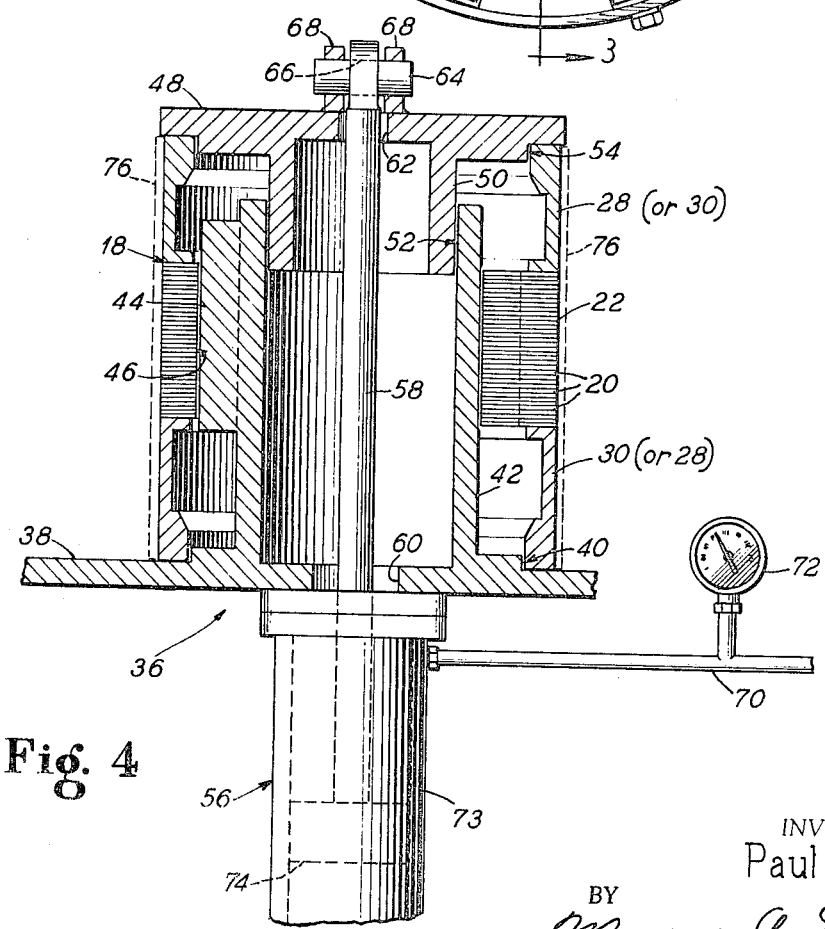
FIG. 4 is a view showing an important step in manufacturing the motor.

The stator shell 18 is assembled in a fixture generally designated 36 and shown in FIG. 4. One of the end rings 28 or 30 is placed on the fixture base 38, centered by circular shoulder 40. Laminations 20 which are to comprise core 22 are stacked on the end ring and are centered about the vertical post 42. At least one vertical rib 44 on that post engages a line of lamination slots 46 to align them for subsequent insertion of the windings 32. The other end ring of the pair 28, 30 and a pressure head 48 are emplaced as shown in FIG. 4. The head is centered by a downward tubular extension 50 slidable within bore 52 of post 42. And the upper end ring 28 or 30 is centered by engaging circular shoulder 54 on the head.

Cylinder and piston means 56 is mounted beneath the base plate 38 and has a piston rod 58 extending upward through the base and head openings 60 and 62 and terminating with a cross pin 64 removably carried in transverse opening 66. Pairs of upstanding guide means 68 on the head stabilize the pin 64 and keep the piston rod from rotating.

The assembly of the shell 18 from the end rings 28, 30 and laminations 20 by means of the apparatus shown in FIG. 4 is a very important step in carrying out the present invention. On the one hand, if the stack of laminations 20 is not sufficiently compressed, it will not comply with the rating agencies' requirements for permissibility; for example, the construction will be considered unsatisfactory by the United States Bureau of Mines if a 0.0015-inch-thickness gauge can be inserted one-eighth inch at any point. Further, no joint should tend to open under explosion pressure. On the other hand, if the stack of laminations 20 is compressed solidly enough to comply with the 0.0015-inch requirement, and the compression required to do this maintained in the finished assembly, the inter lamination compression would be so great that there would be a tendency for the electrical insulating coating on the laminations to flow or cut through and break down.

In view of the above considerations, the core 22 must be adequately but not excessively compressed. A procedure found to be highly satisfactory is to over compress initially, then back off the pressure and hold it at a lower level while welding the shell into a permaent assembly. Specifically, fluid (from a pressure source not shown) is directed through pipe 70 containing gauge 72 into cylinder 73 of cylinder and piston means 56, on the piston rod side of piston 74. This causes the head 48 to be drawn down, compressing the laminations 20 between end rings 28, 30. The initial pressure in the cylinder 73 should be sufficient to apply an initial inter lamination compression of approximately 800 pounds per square inch. This will set the laminations, flatten them, and close up any gaps which otherwise might be left between them. Then, the cylinder pressure is backed off to reduce the inter lamination compression to a range between 400 and 600 pounds per square inch (preferably, about 400 p.s.i.). While the cylinder pressure is so maintained, tension straps 76 are welded in an axial direction, between the end rings 28, 30, and spaced circumferentially about the periphery of the shell 18. And, generally, it will be worthwhile to weld the tension straps to the outer edges of the laminations as shown in FIG. 1. The weld-assembled shell 18 is then freed from the fixture 36 by releasing the cylinder pressure and removing pin 64.

The stator shell 18 thus comprises a stator lamination core 22 flanked by end rings 28, 30, all held in permanently compressed assembly by tension straps 76. An important feature of the stator shell which contributes to the success of this invention is that it has, in effect, a single, uniform diameter, cylindrical outer heat-discharging surface, generally designated 78. This comprises same-diameter outer heat discharging cylindrical surface portions 80, 82, and 84 of the end ring 28, the core 22, and the end ring 30, respectively. One advantage is that tension straps 76 can be perfectly straight, minimizing their required size because they are subject only to easily calculated, simple tension and torsion forces. Another advantage is that the heat generated in the motor can be readily and uniformly transferred, from the uniform diameter surfaces 80, 82, 84, by a continuous annular stream of cooling air passing along the length of the shell 18, as will be described.

The rotor 14 forms no part of the present invention so that details of it will not be described here except to point out that it may be conventional, and mounted on a shaft 86 journaled for rotation respectively in end frames 88 and 90. The shaft 86 has a tapered and threaded power output end 92 for suitable connection to drive gearing. At the other end, a fan 94 is held by key 96, nut 98, and lock washer 100.

Both end frames 88, 90 are substantially alike with relatively minor design variations in the bearing and lubrication arrangements which have no significance here.

The end frame 88, at the power end of the motor, comprises an annular end plate 102 fixed to and sealed against end ring 28 by bolts 104. It has a series of tapped openings 105 to end mount the motor, for example against a transmission housing not shown. A bearing and grease retainer 106 is welded into a central bore 108 in end plate 102. A ball bearing 110 is carried by the retainer 106 and supports the power end of shaft 86. A grease seal retainer 112 fixed to the bearing retainer 106 by bolts 114 has a pair of seals 116, 116 engaging the shaft.

The fan end frame 90 is similar, though not identical, to frame 88. Corresponding parts are indicated by the same reference numbers followed by an "a." For example, the end plate 102a is the counterpart of 102.

The motor 10, thus, is sealed, as is required by permissibility. No air capable of carrying a spark or an ignition temperature can move from the inside to the outside; and in the unlikely event of an explosion inside the motor, it will be unable to set off an explosion outside.

Figure 2:
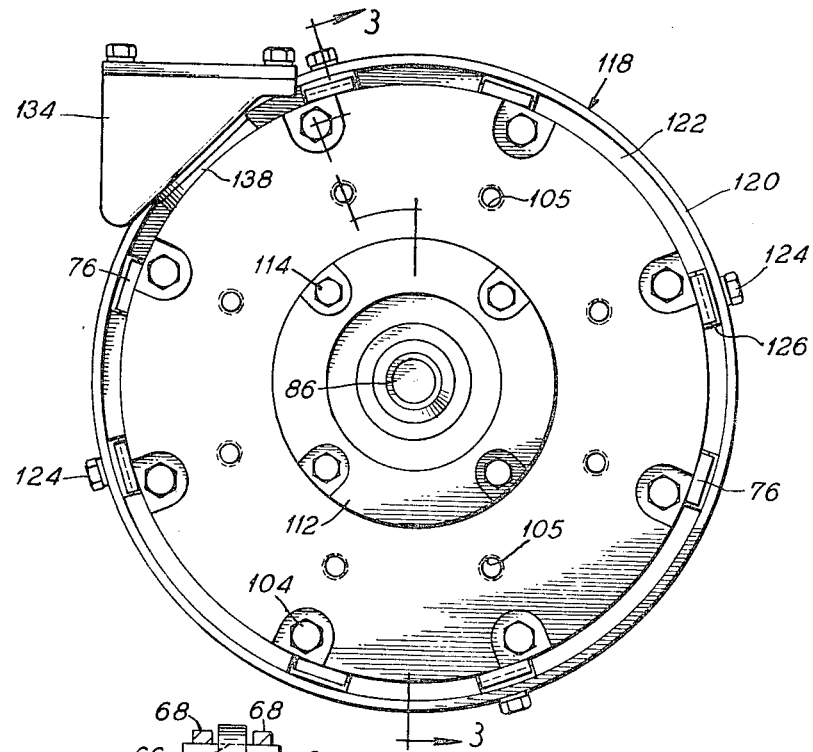
FIG. 2 is a right hand end view of FIG. 1.

An air guiding housing generally designated 118 comprises a circumferential continuous tubular guide ring 120 radially spaced from the end ring 30 sufficiently to provide an annular air outlet 122 (see FIG. 2) positioned to direct cooling air along the outer, heat-discharging surface portions 84, 82, and 80 (in that order) of the end rings and core. See FIG. 3, where the straight line movement of the cooling air from the guide ring 120, through annular opening 122, and lengthwise along the stator surfaces is clearly shown by arrows.

The air guide ring 120 is fixed to the end ring 30 by bolts 124, with spacers 126 and tension straps 76 maintaining the desired annular spacing 122.

Figure 3:
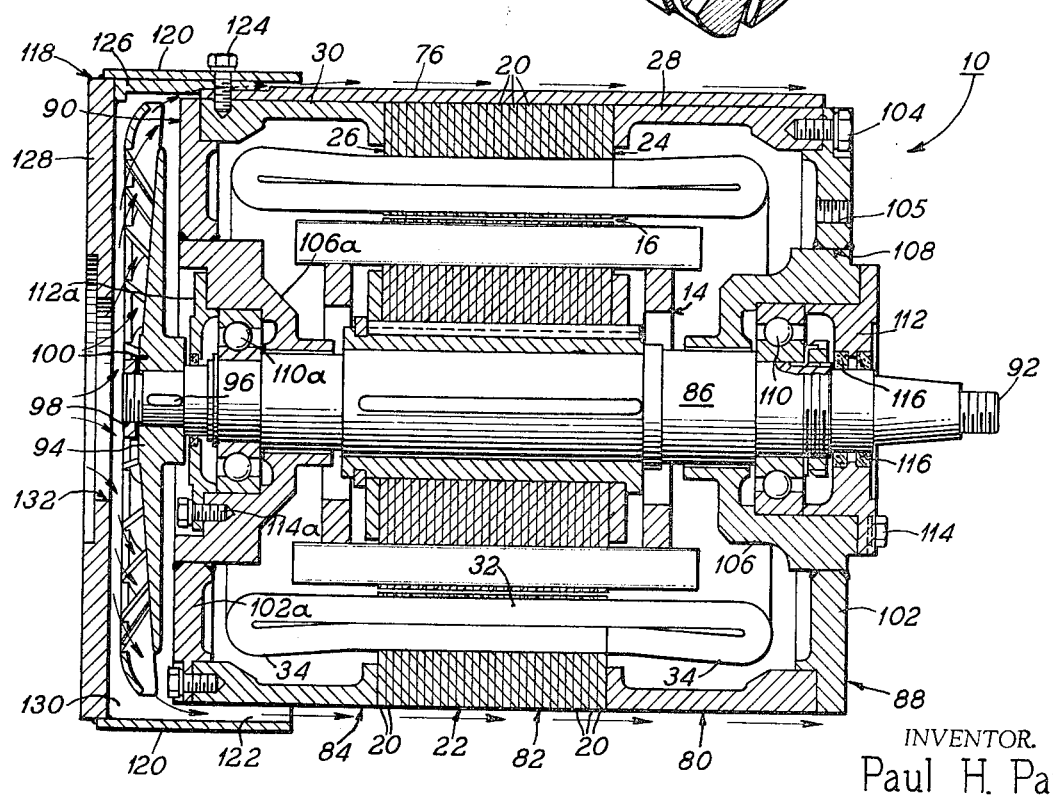
FIG. 3 is a longitudinal cross section of FIG. 2 taken on line 3—3.

An inlet end disc 128 is welded to the air guide ring 120 and spacers 126, as shown in FIG. 3, and is spaced axially from end frame 90 a suitable amount to provide a plenum 130 within which the fan 94 operates. An air inlet opening 132 is provided in end plate 128, aligned with the eye of the fan.

A connection box 134 (FIG. 2) is provided on the end ring 28 in the usual way to provide sealed access for cable 136 (FIG. 1) which is connected to the stator windings inside the motor. Preferably, the connector box is spaced above the heat discharging surface 80 by a hollow boss 138 to enable cooling air to flow beneath it.

In operation, heat will be generated in the core 22 and windings 32, and will travel to the outer heat-discharging surfaces 80, 82, and 84 of the stator shell assembly 18. These surfaces are aligned portions of the same cylindrical surface previously identified generally by the number 78. Thus, when ambient cooling air is drawn into the plenum 130 and discharged through air guide outlet 120 and directed thereby in a circumferentially continuous annular stream or envelope along the shell 18, the latter will be cooled uniformly along its length. For the best heat transmission from the core surface 82, it is preferable that the external edges of the laminations 20 be in their as-punched, and unmachined condition. This provides a matte surface conducive to the best head transfer.

While I have herein shown and described one form in which the invention may be embodied, it may readily be understood that various variations and modifications in the invention may be attained without departing from the spirit and scope of the novel concept thereof.

I claim as my invention:

1. In a frameless, permissible dynamoelectric machine
   a stator shell comprising a plurality of laminations juxtaposed to form a core open to the ambient atmosphere with an axial rotor-receiving bore and at least one winding extending through the core and having portions projecting beyond end faces of the core, and a pair of end rings flanking and abutting the end faces and encircling the projecting portions of the winding;
   the end rings and core having aligned outer heat-discharging peripheral surfaces;
   tension straps extending axially along said peripheral surfaces, fastened to the end rings, effective to maintain the core under compression;
   an end frame connected to each end ring and forming with the stator shell a sealed, explosion-proof enclosure;
   a rotor within the bore rotatably journaled in the end frames;
   a fan carried by the rotor exteriorly of one of the end frames;
   air guide means supported by the stator shell effective to direct cooling air from the fan in an axial direction along the stator shell across said aligned outer heat-discharging peripheral surfaces of the end rings and the core; and
   said end rings being compressed against the ends of the core by the tension straps to maintain compression stresses between adjacent laminations in the range of 400 to 600 pounds per square inch.

2. In a frameless, permissible dynamoelectric machine, the combination of claim 1 in which
said outer heat-discharging peripheral surfaces of the end rings and core are substantially the same cross-sectional size and shape to facilitate the uniform, uninterrupted flow of cooling air from end to end along the length of the stator shell.

3. In a frameless, permissible dynamoelectric machine, the combination of claim 2 in which
the external edges of the laminations are punched but unmachined to provide a matte finish for said outer heat-discharging peripheral surface of the core to facilitate the transfer of heat into the cooling air passing across the core.

4. In a frameless, permissible dynamoelectric machine, the combination of claim 1 in which
the tension straps are affixed at least to the end rings by welding.

5. In a frameless, permissible dynamoelectric machine, the combination of claim 1 in which
said outer heat-discharging peripheral surfaces of the end rings and core are circular in cross section and have substantially the same diameter.

6. In a frameless, permissible dynamoelectric machine, the combination of claim 5 in which
said air guide means includes a cylindrical, tubular outlet portion encircling one of the end rings and radially spaced therefrom to provide a substantially continuous annular air outlet opening positioned to direct a substantially unbroken stream of air along said outer heat discharging peripheral surfaces of the end rings and core.

7. In a frameless, permissible dynamoelectric machine, the combination of claim 6 in which
the end frame opposite the fan is provided with means for mounting the machine independent of said outer heat-transferring peripheral surfaces of the end rings and core.

8. In a frameless, permissible dynamoelectric machine, the combination of claim 5 in which
the tension straps are parallel straight-line structural elements welded at opposite ends to said end rings.

9. In a frameless, permissible dynamoelectric machine, an elongated heat-transmitting shell having a substantially uniform diameter outer heat discharging peripheral surface and an axial rotor-receiving bore;
said shell comprising a stator lamination core flanked by a pair of end rings having means compressing the core between them in the range of 400 to 600 pounds per square inch;
said peripheral surface of the shell comprising axially-aligned, same-diameter, abutting outer cylindrical surfaces of the end rings and core respectively;
an annular air guide supported at one end of the shell;
a rotor-carried fan at said one end of the shell and an air guiding housing directing ambient cooling air through the fan and said annular air guide in a circumferentially continuous stream along the length of said peripheral surface of the shell.

10. In a frameless, permissible dynamoelectric machine,
a stator shell comprising a plurality of laminations juxtaposed to form a core with an axial rotor-receiving bore and at least one winding extending through the core and having portions projecting beyond end faces of the core, and a pair of end rings flanking and abutting the end faces and encircling the projecting portions of the winding;
the end rings and core having aligned outer heat-discharging peripheral surfaces;
tension straps extending axially along said peripheral surfaces, fastened to the end rings, effective to maintain the core under 400 to 600 pounds per square inch compression;
an end frame connected to each end ring and forming with the stator shell a sealed, explosion-proof enclosure; and
a rotor within the bore rotatably journaled in the end frames.

11. In a method of making a frameless, permissible dynamoelectric machine having end rings flanking a stack of laminations and coaxial therewith, the steps of:
(a) stacking the laminations between the end rings with their outer peripheral surfaces aligned;
(b) applying a presetting compressive force to the end rings to compress the outer peripheral portion of the laminations to a maximum of 800 pounds per square inch;
(c) relaxing the compressive force to bring the compression in the peripheral portion of the laminations into the range of 400 to 600 pounds per square inch; and
(d) holding the compression in condition "(c)" while welding axially extending tension straps between the end rings.

References Cited
UNITED STATES PATENTS

| | | | |
|---|---|---|---|
| 1,921,845 | 8/1933 | Smith et al. | 310—57 |
| 1,851,572 | 3/1932 | Ehrenfeld | 310—258 |
| 2,931,927 | 4/1960 | McAdam et al. | 310—88 XR |
| 2,947,892 | 8/1960 | Inculet et al. | 310—59 XR |
| 2,736,826 | 2/1956 | Hoover | 310—88 |
| 2,393,065 | 1/1946 | Rose | 310—217 XR |

FOREIGN PATENTS

| | | |
|---|---|---|
| 1,218,599 | 6/1966 | Germany. |
| 1,114,413 | 5/1968 | Great Britain. |
| 90,916 | 3/1968 | France. |
| 824,439 | 12/1959 | Great Britain. |
| 842,316 | 7/1960 | Great Britain. |

J. D. MILLER, Primary Examiner

B. A. REYNOLDS, Assistant Examiner

U.S. Cl. X.R.

29—609; 310—63, 68, 217, 259